May 4, 1954   J. R. TRUPPE   2,677,193
LEVEL DEVICE
Filed Jan. 3, 1951   3 Sheets-Sheet 1
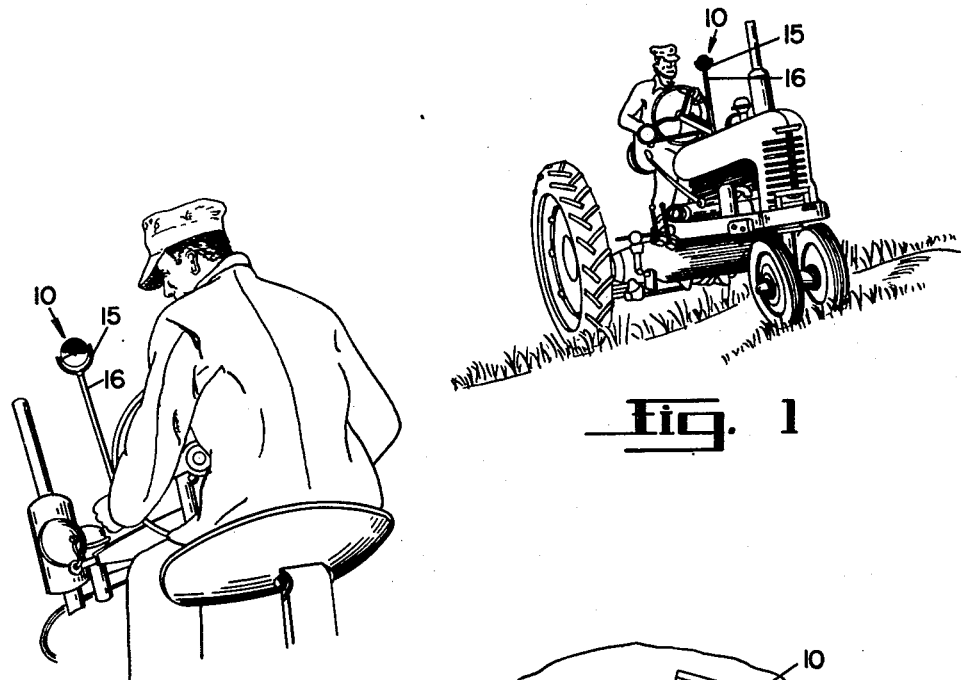
Fig. 1
Fig. 2
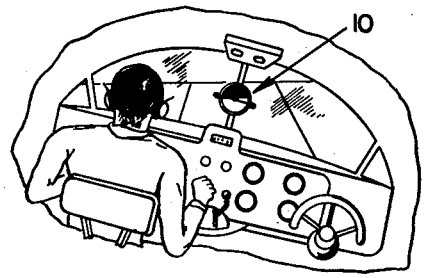
Fig. 3
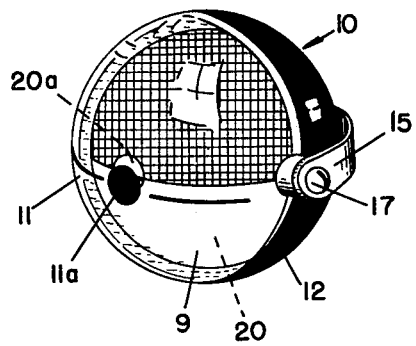
Fig. 4
INVENTOR
JOHN R. TRUPPE
By
Louis W. Malsky
ATTORNEY

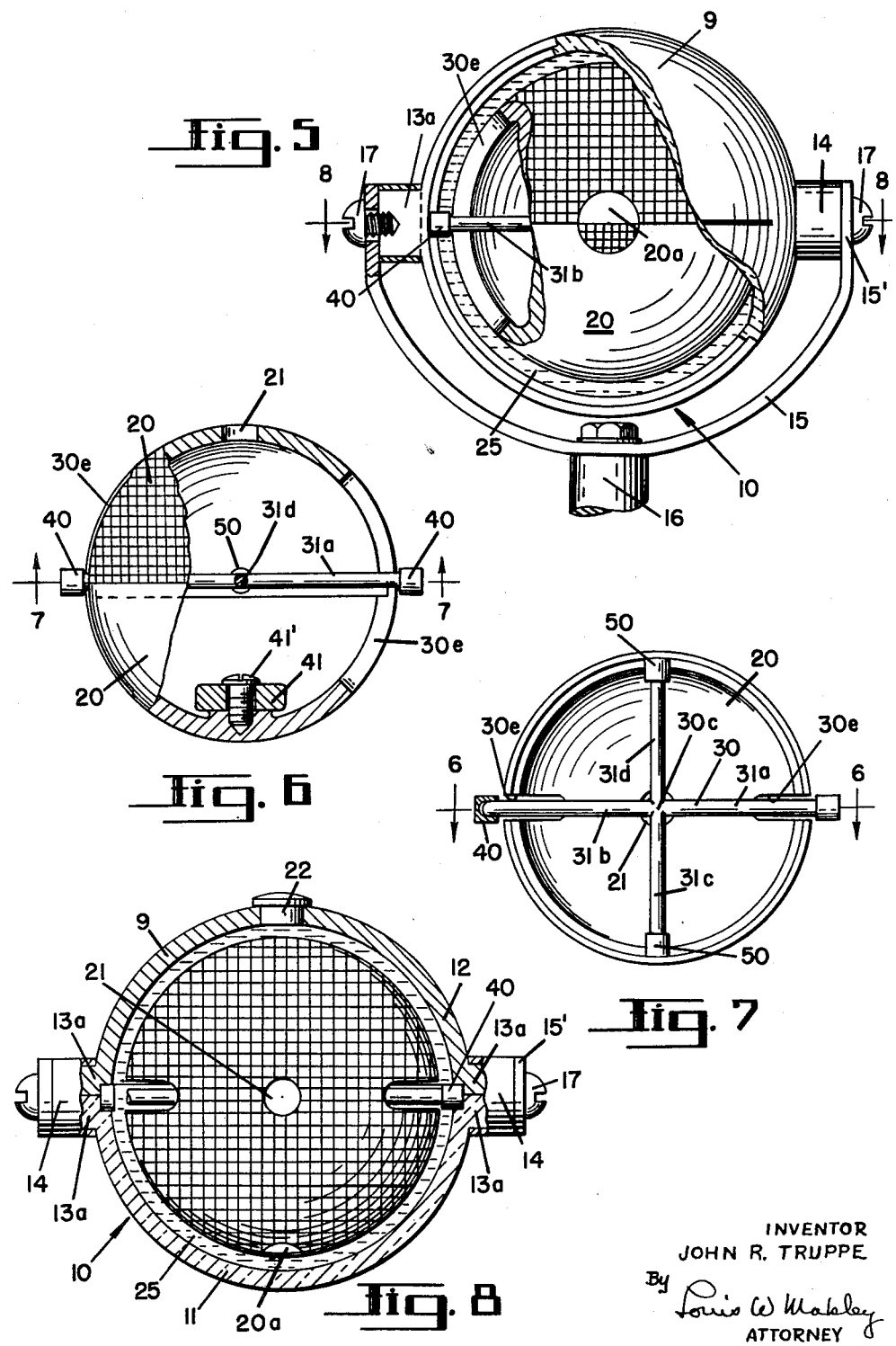

May 4, 1954  J. R. TRUPPE  2,677,193
LEVEL DEVICE

Filed Jan. 3, 1951  3 Sheets-Sheet 3

INVENTOR
JOHN R. TRUPPE
ATTORNEY

Patented May 4, 1954

2,677,193

UNITED STATES PATENT OFFICE 2,677,193

LEVEL DEVICE

John R. Truppe, Dayton, Ohio

Application January 3, 1951, Serial No. 204,226

5 Claims. (Cl. 33—215)

My invention relates to a device adapted to indicate visually by use of registering targets, a change in incline or grade of a moving vehicle and the deviation from predetermined level grade of the vehicle on which it is attached, such as an airplane, automobile or tractor. The device is sensitive to a vehicle's longitudinal and transverse axis deviation from normal level travel.

An object of my invention is to provide a device to register visually, deviations from normal level travel of a vehicle by means of cooperating sphere elements, each containing registerable target marks thereon.

Further objects and advantages of my invention will be found in its simple construction as shown in the accompanying drawing which forms a part of the specification and in which:

Figure 1 shows my invention mounted for use on a tractor for contour plowing;

Figure 2 shows a close up view of my invention conventionally mounted on a tractor indicating a deviation from normal level travel of the vehicle;

Figure 3 illustrates my invention mounted on an airplane and indicating a transverse axis deviation from normal horizontal;

Figure 4, a perspective view of my invention indicating target marks cut out of register;

Figure 5, a front view of my invention with partial sections cut away to illustrate method of construction and arrangement of interior elements including interior target mark, showing outer ball in section and inner ball in full.

Figure 6, partial cross-section view of inner sphere taken on line 6—6 of Figure 7 showing weight element and shaft mounting;

Figure 7, a cross-section view taken on line 7—7 of Figure 6 showing method of supporting spider shafts;

Figure 8 illustrates an elevation view taken along line 8—8 of Figure 5, also showing sphere filled with liquid.

Figure 9:
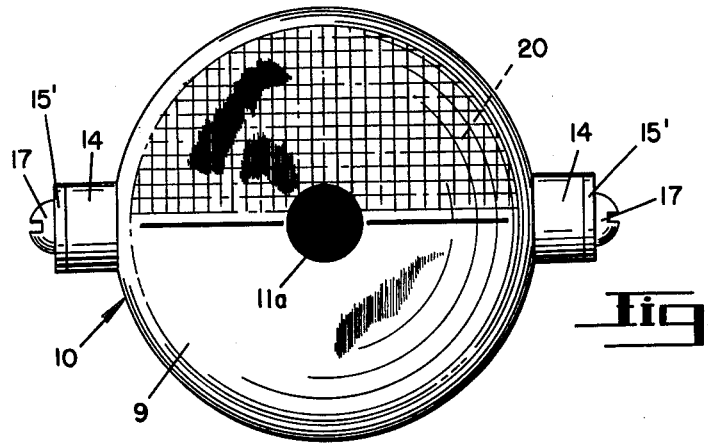

Figure 9, a front elevation view illustrating my invention with interior and exterior target marks in full register.

Figure 10:
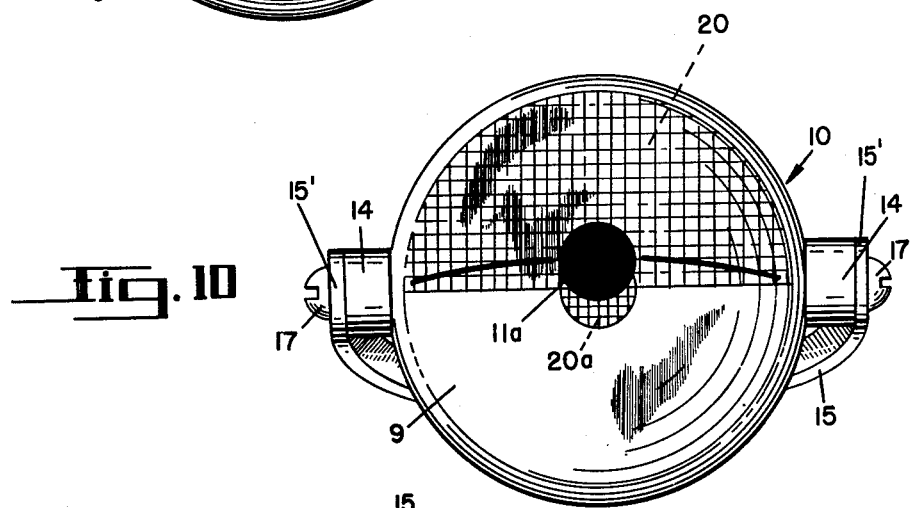
Figure 11:
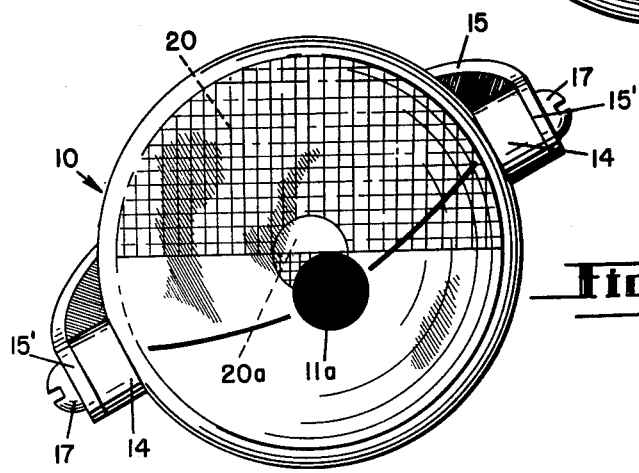

Figures 10 and 11, front perspective views showing target marks partially out of register.

Referring to the drawings in which similar reference numerals indicate similar parts throughout the various views numeral 10 refers to the entire device as shown in Figures 1, 2, 3 and 4, 5 and 8. In Figure 4 and Figure 8, the outer sphere 9 is shown made of two sections, the front sector 9 is shown made of two sections, the front sector II being transparent and contains exterior target mark IIa, the back section 12 is opaque and completes the sphere structurally, both sections are formed with projecting stubs, 13a, for support as shown in Figures 5 and 8, over which are positioned ferrule numbers 14, which strengthen stubs 13a, and provide a surface against which bracket end 15' of bracket 15 can bear. Screws 17 are threaded in a hole as shown in Figure 5, provided in stubs 13a, and when tightened maintain the device properly in bracket 15, on a support 16 as shown in Figure 5.

Within exterior sphere 9 is rotatably mounted inner sphere 20, also made of two sections joined by cement or the like and is provided with inner target mark 20a, etched, painted or otherwise impressed on a portion of the front section of the sphere 20. As shown in Figures 4, 5, 10 and 11, both target marks IIa and 20a are provided on their respective spheres so that both marks are adapted to be brought into registration, i. e., outer mark IIa covers inner mark 20a, whereby the device visually indicates level travel of vehicle on which it is mounted.

This feature of providing a means to easily indicate visually to an operator of a vehicle on which my invention is used, such as a tractor, by registering two marks on cooperating spheres constitutes one of the objects of my invention.

In order to allow inner sphere 20 to freely rotate on a transverse or longitudinal axis within sphere II, I have provided a spider 30, of metal, consisting of four members being joined at their intermediate points 30c, which locates the geometrical centre of my invention. It will be observed that the ends of supports 31a, 31b terminate and rotate in bushings 40, mounted within sphere 9, as shown in Figures 5, 7, and 8, while supports 31c and 31d of spider 30 terminate and rotate in bushings 50, mounted within sphere 20 as illustrated in Figure 7. By so constructing spider 30, as described hereinabove, rotation of inner sphere 20 can be made in all directions to accommodate any variation from level travel of said vehicle.

It is believed that this construction of a support for cooperating rotatable spheres also constitutes invention.

Sphere 20 has two oppositely disposed slots 30e, which limit rotation and permit it to partially rotate on the transverse axis as shown in Figures 7 and 8. A weight 41 is retained within the sphere 20 by screw 41' illustrated in Fig. 6. This weight gives a pendulum effect to sphere 20 and provides a means for maintaining sphere 20 in a normal level position and mark 20a adaptable for registration with mark IIa. A liquid 25, such as oil or the like, is introduced into sphere II and sphere 20 so that a dampening means is obtained for sphere 20 when the same is in use and being moved, the oil prevents a too quick response of the device to a change in longitudinal or transverse position. Air accidentally caught in sphere 20 escapes through hole 21 of sphere 20, and to atmosphere before sphere 9 is closed by plug 22. It has been found convenient to use a commercial plastic to form all sphere elements of my device 10, but it is contemplated that other suitable materials such as glass or the like might be used. As presently employed, plastic is found to be cheaper and more durable than other materials.

The shading of outer sphere section 12 and the top section of inner sphere 20 indicates the use of color for establishing a striking appearance and for utilitarian reason of presenting to the user easy visual perception of the change in level position of a vehicle and the need for establishing the target marks in register in order to achieve level travel. Obviously the turning of such a vehicle to the right or left of travel will bring the marks in full registration. When used on aircraft or other vehicles an indication of change in horizontal travel is also made for the information of the user.

Having described my invention, I claim the following:

1. A level indicating device comprising two cooperating sphere elements, one of said sphere elements being smaller and being rotatably mounted within the other sphere element; liquid substantially filling said spheres; means including a single support member mounted in both sphere elements and by means of which one of said spheres moves, in relation to the other sphere to cause registration thereof to a predetermined target mark.

2. A level indicating device according to claim 1, wherein the single support comprises a unitary cross member having one of its cross members furnishing a bearing for said smaller sphere element for oscillation on one axis and the other cross member furnishing a bearing for said sphere element for oscillation on another axis.

3. A level visual indicating device for use upon vehicles and comprising an inner sphere element mounted by means of a single cross member within an outer sphere element and adapted to partially rotate therein in either a transverse or longitudinal direction with or on said cross member; liquid means adapted to dampen the movement of said rotatable sphere and fully covering the same; weight means rigidly contained in the normally lower portion of said inner sphere element to maintain said inner element in a normal level position; and means including circular target marks, one on the inner sphere being controlled by movement of the inner sphere on and with the cross member to visually determine when said sphere elements are normally in register whereby level grade is obtained.

4. In a level indicating device according to claim 3, wherein there is provided a unitary cross-shaped mounting member so constructed as to furnish a bearing for one of said sphere elements to cause it to turn on one pair of arms of the cross member and to turn with the other pair of arms of the cross member to indicate a level condition of any vehicle upon which said device is being used; and wherein said target marks are round dots, one being on each of said sphere elements.

5. A level device for use on vehicles of varying types, said device comprising two spherical members, one of said members being rotatably mounted within the other spherical member and adapted to cooperate therewith so as to obtain a registration of targets on the front portion of each of said spherical members; a support consisting of four centrally joined cross axles, each of said four axles having their respective ends terminating in bushings to form bearings for the smaller of said spherical members, one pair of said centrally joined axles being shorter than the other pair to accommodate for said bearings; the outer and larger of said spherical members furnishing a bearing for the larger or longer pair of said cross axles and liquid means filling said spherical members to dampen the rotation of said inner supported spherical member whereby registration of said targets is obtained.

References Cited in the file of this patent

UNITED STATES PATENTS

| Number | Name | Date |
| --- | --- | --- |
| 1,023,858 | Laures | Apr. 23, 1912 |
| 1,297,504 | Skulina | Mar. 18, 1919 |
| 1,306,882 | Clarke | June 17, 1919 |
| 1,346,547 | Lockland | July 13, 1920 |
| 1,860,257 | Marshall | May 24, 1932 |
| 1,924,761 | Turner | Aug. 29, 1933 |
| 2,192,148 | Otto, Jr. | Feb. 27, 1940 |
| 2,260,396 | Otto, Jr. | Oct. 28, 1941 |
| 2,384,586 | Allgeo | Sept. 11, 1945 |
| 2,392,494 | Murtagh | Jan. 8, 1946 |
| 2,489,294 | Kenyon | Nov. 29, 1949 |

FOREIGN PATENTS

| Number | Country | Date |
| --- | --- | --- |
| 349,554 | Germany | Dec. 22, 1915 |
| 101,466 | Great Britain | Sept. 21, 1916 |